Patented Feb. 11, 1947

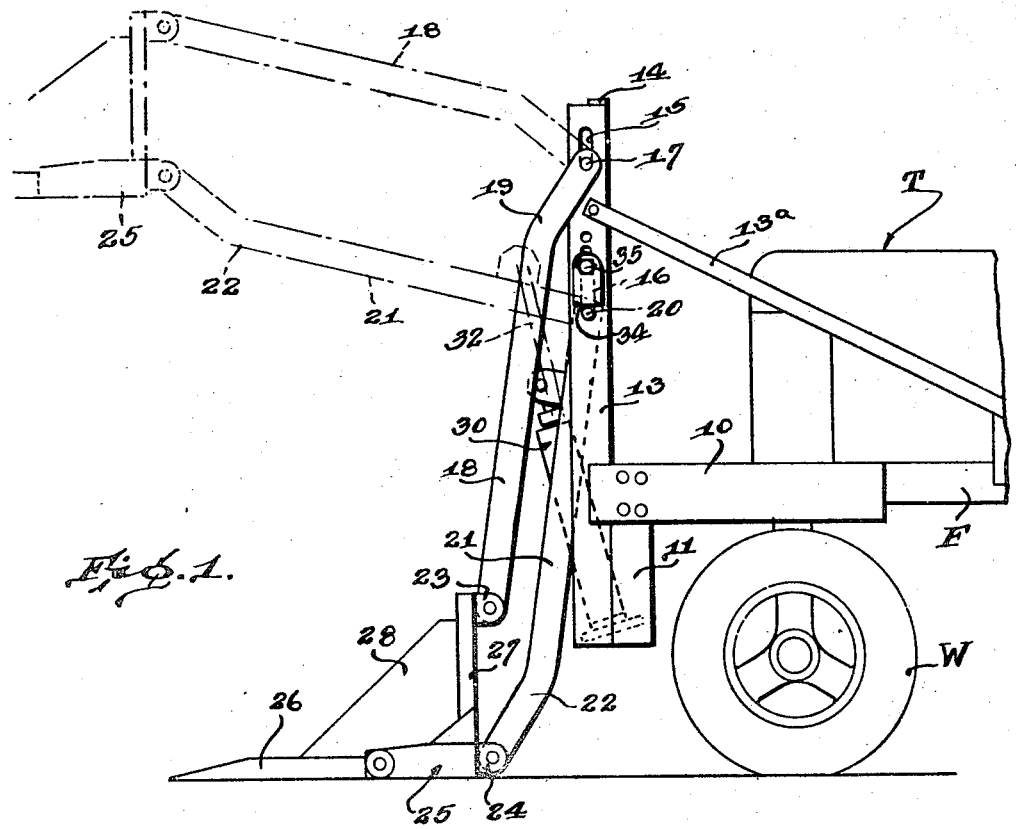
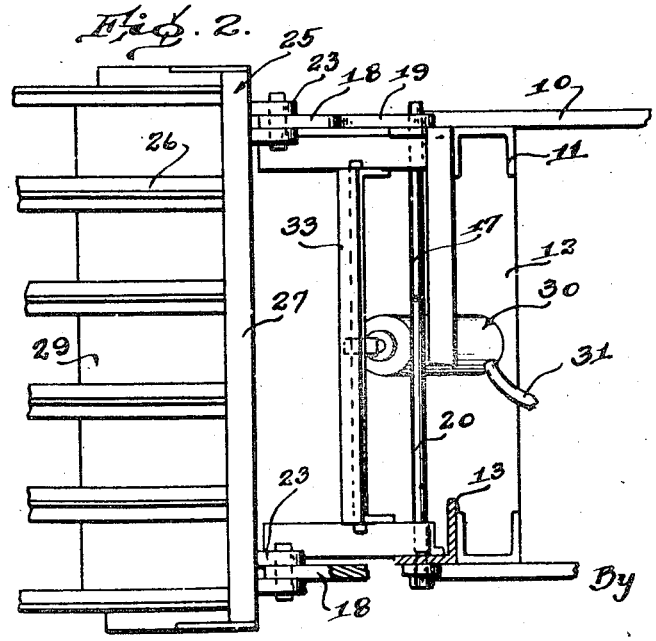
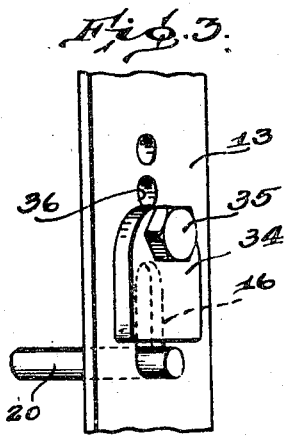

2,415,515

UNITED STATES PATENT OFFICE 2,415,515

COMBINED DIGGING AND LOADING DEVICE FOR TRACTORS OR THE LIKE

Morse McOscar, Napoleon, Ohio

Application June 8, 1945, Serial No. 598,257

4 Claims. (Cl. 214—131)

This invention relates to loading devices but more particularly to a loader or digger which is adapted to be mounted on a tractor, truck or the like, and although useful in a variety of situations, it is particularly adapted for digging manure, and an object is to produce a simple and efficient device of this character which can be readily mounted as an attachment on a tractor or the like and is provided with the new and improved features of construction, arrangement and operation hereinafter described.

For purposes of illustration but not of limitation, an embodiment of the invention is shown on the accompanying drawing in which Figure 1 is a side elevation of the loading device mounted on the front end of a tractor, a fragment only of the latter being illustrated;

Figure 2 is a top plan view partly in section of the loading device shown on Figure 1, the tractor being broken away; and Figure 3 is a fragmentary perspective view showing the adjustable mounting for the bar to which the lower of the parallel arms are secured and illustrating the adjusting means therefore.

The illustrated embodiment of the invention comprises a tractor T having a chassis frame F and front wheels W. Suitably secured as by bolting to the longitudinal side members of the tractor frame F are beams 10 which project forwardly beyond the frame and extend to a point in front of the wheels W. Suitably fixed to the front end portion of the beams 10 are depending beams 11, the lower ends of which are rigidly connected by a horizontal plate or platform member 12. Mounted upon the platform 12 and abutting against the front end of each of the beams 11 are angle iron uprights 13 which may be fixedly secured in position in any suitable manner as by welding. The upper ends of the uprights 13 are connected and braced by a relatively narrow plate 14. Braces 13a extend rearwardly from the upper portions of the uprights 13 to any suitable point on the tractor frame F. Formed in each of the uprights 13 on the outer sides thereof is a pair of vertically elongate slots 15 and 16.

A rod 17 extends from one upright 13 to the other and projects through the slots 15 in these uprights, and fixedly secured to the ends of the rod 17 are arms 18, each of which is formed with an angular portion 19 in close proximity to the adjacent upright 13. As shown by the broken line position of the arm 17 in Figure 1, the angular portions of the arm 17 form an angle of the order of 155°. Extending through the vertically elongate slot 16 in the uprights 13 in the region below the slot 15 is a rod 20 and disposed on the inner side of each upright 13 and securely fixed to the rod 20 are arms 21 which, in the region of their opposite or outer end, are formed with angular portions 22 of similar angularity to the angular portions 19 but extending in the opposite direction, this being clear from an inspection of the broken line position shown in Figure 1.

The outer ends of the arms 18 and 21 are pivotally connected to spaced brackets 23 and 24 respectively carried by a frame 25 to which is pivotally mounted at 25a a bucket 28 which is provided with a plurality of outwardly extending teeth 26 forming a portion of the bottom of the bucket. A plate 29 also provides a portion of the bucket bottom. It will be understood that the bucket supporting frame 25 has a back plate 27 to which the parallel arms 18 and 21 are pivoted. Suitable latches (not shown) hold the bucket in the position shown and by releasing the latches, the bucket can tilt forwardly to discharge its contents.

A hydraulic cylinder and piston assembly 30 is provided for raising and lowering the arms from the full line position in Figure 1 to the broken line position or to a position higher than the broken line position or any intermediate position. The cylinder is suitably mounted on the platform 12 and a tube 31 leads to the cylinder from any suitable source of liquid under pressure. The piston 32 is suitably secured to a cross bar 33 which is suitably fixed at its opposite ends to the lower arms 21 and in the region in close proximity to the pivotal mountings thereof on the uprights 13. It will be manifest that by introducing fluid under pressure to the cylinders 30, the arms 18 and 21, maintaining their parallel relation, are swung upwardly, the bucket 25 maintaining its horizontal position at all times. Due to the angular portions 19 and 22 of the parallel arms, the bucket can be brought much closer inward toward the uprights 13, thereby greatly facilitating the digging operation as well as increasing the range of movement.

As will hereinafter be explained, it is desirable to control the sliding movement of the pivotal rod 20 in its vertical slots and for this purpose, a plate 34 is selectively secured by a bolt 35 in one of a series of vertically spaced holes 36 in each of the uprights 13. Thus by raising or lowering the position of the plate 34, the pivotal rod 20 may slide upwardly a greater or less distance as desired. Thus in order to vary the vertical movement of the pivotal rod, it is merely necessary to loosen the bolt 35 and raise or lower the plate 34 to the desired position and then tighten the bolt in the selected opening 36. Ordinarily, the span between the inner ends of the spaced parallel arms 18 and 21 is adjusted equal to the span between their outer ends respectively, thus forming a parallelogram which maintains the shovel 25 supported by the outer ends in a constant horizontal position regardless of arm movement. However, when the moveable plate 34 is adjustably raised, the subsequent span between the inner ends of the parallel spaced arms is less than the span between their outer ends, thereby to comprise a trapezoidal relationship which results in raising the rear of the bucket 25 when in the lowered position, effectively lowering the points of the teeth, facilitating digging operations. The teeth are similarly upwardly disposed when the bucket is raised to the carrying position, thus aiding carrying operations. It is manifest that I have provided simple means for adjustably positioning the angular disposition of the bucket thereby to increase the adaptability of the unit for various uses.

From the above description, it will be manifest that I have produced an exceedingly simple and inexpensive loading and digging device which can be conveniently mounted on an ordinary farm tractor or truck particularly at the front end thereof, and which can be moved thereby and forced into a pile of manure, dirt or the like in any desired position of elevation and then carried by the device to the desired location where its load can be readily dumped.

It is to be understood that numerous changes in details of construction, arrangement and operation may be effected without departing from the spirit of the invention especially as defined in the appended claims.

What I claim is:

1. A loading device comprising a frame adapted to be attached to a tractor, truck or the like, a pair of laterally spaced upright supports on said frame, a pair of parallel arms pivoted at their inner ends to each upright support in vertically spaced relation, a downwardly inclined inner end portion on the uppermost of each pair of parallel arms, an upwardly inclined outer end portion on the lowermost of each pair of parallel arms, a bucket, pivotal connections between the outer ends of said arms and said bucket, the pivotal mounting for the inner ends of said lowermost pair of parallel arms enabling limited sliding movement in an up and down direction, adjustable means for regulating the extent of such sliding movement, and means carried by said frame for imparting swinging movement to said arms thereby to effect raising and lowering movements of said bucket.

2. A loading device as claimed in claim 1, in which the pivotal mounting for the inner ends of said lowermost arms comprises a vertically elongate slot in each of said uprights respectively and having portions slidable in said slots, and an adjustable stop associated with each end of said rod for regulating the sliding movement thereof.

3. A loading device as claimed in claim 1, in which the means imparting swinging movement comprises a hydraulic piston and cylinder assembly mounted on said frame between said uprights, a cross bar connecting the lower pair of arms in the region of their inner pivotal mounting, and an operative connection between said hydraulic assembly and said cross bar.

4. A loading device comprising a frame adapted to be attached to a tractor, truck, or the like, a pair of laterally spaced upright supports on said frame, a pair of parallel arms pivoted at their inner ends to each upright support in vertically spaced relation, a downwardly inclined inner end portion on the uppermost of each parallel arms, an upwardly inclined outer end portion on the lowermost of each parallel arms, a bucket, a pivotal connection between the outer ends of said arms and said bucket, means adjusting the spaced relation between the inner ends of said uppermost and lowermost parallel arms thereby to vary the angular disposition of said bucket during raising or lowering movements, said adjusting means comprising a pivotal rod connecting the inner ends of the lowermost parallel arms, a vertically disposed slot in each of said spaced upright supports in which said rod is slidably mounted, and an adjustable stop associated with each slot limiting the rod movement therein, and means carried by said frame for imparting swinging movement to said arms thereby to effect raising or lowering movements of said bucket.

MORSE McOSCAR.

REFERENCES CITED

The following references are of record in the file of this patent:

UNITED STATES PATENTS

| Number | Name | Date |
| --- | --- | --- |
| 2,385,512 | Heath | Sept. 25, 1945 |
| 2,341,776 | Heath | Feb. 14, 1944 |
| 2,278,412 | Calvert | Apr. 7, 1942 |
| 704,836 | Kauffman | July 15, 1902 |
| 1,543,214 | Luce | June 23, 1925 |
| 1,339,661 | Milton | May 11, 1920 |
| 2,391,224 | Carter | Dec. 18, 1945 |
| 2,001,803 | Stephens | May 21, 1935 |
| 2,348,899 | Guignard et al. | May 16, 1944 |
| 1,527,251 | Furst | Feb. 24, 1925 |